(12) United States Patent
Wang et al.

(10) Patent No.: US 11,345,254 B2
(45) Date of Patent: May 31, 2022

(54) EKF STATE RELAY STRATEGY IN BATTERY ONLINE IDENTIFICATION

(71) Applicant: FORD GLOBAL TECHNOLOGIES, LLC, Dearborn, MI (US)

(72) Inventors: Xu Wang, Northville, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 16/721,213

(22) Filed: Dec. 19, 2019

(65) Prior Publication Data

US 2021/0188120 A1  Jun. 24, 2021

(51) Int. Cl.
  *B60L 58/13* (2019.01)
  *B60L 58/15* (2019.01)
  *B60L 58/14* (2019.01)
  *B60L 58/16* (2019.01)

(52) U.S. Cl.
  CPC ............ *B60L 58/13* (2019.02); *B60L 58/14* (2019.02); *B60L 58/15* (2019.02); *B60L 58/16* (2019.02)

(58) Field of Classification Search
  None
  See application file for complete search history.

(56) References Cited

U.S. PATENT DOCUMENTS

| 5,969,508 | A | * | 10/1999 | Patino | H02J 7/008 320/153 |
|---|---|---|---|---|---|
| 9,368,841 | B2 | | 6/2016 | Wang et al. | |
| 9,440,552 | B2 | | 9/2016 | Li | |
| 9,718,455 | B2 | | 8/2017 | Yu et al. | |
| 2009/0091299 | A1 | * | 4/2009 | Lin | H01M 10/482 320/137 |
| 2012/0086405 | A1 | * | 4/2012 | Shigemizu | G01R 31/3842 320/149 |
| 2014/0266059 | A1 | | 9/2014 | Li et al. | |
| 2014/0278167 | A1 | * | 9/2014 | Frost | G01R 31/3644 702/63 |
| 2019/0064282 | A1 | * | 2/2019 | Haga | H01M 10/617 |

* cited by examiner

*Primary Examiner* — Jared Fureman
*Assistant Examiner* — Joel Barnett
(74) *Attorney, Agent, or Firm* — David B. Kelley; Brooks Kushman P.C.

(57) ABSTRACT

A vehicle includes a battery and a controller. The controller is programmed to executed a parameter estimation strategy for the battery during time intervals when the current flowing through the battery is sufficiently dynamic. During periods of generally constant current, the parameters are derived from the last valid parameters from the parameter estimation strategy. During periods of generally constant current in which a battery temperature and/or a state of charge of the battery changes by a predetermined amount, the parameters are derived from historical parameter values.

20 Claims, 4 Drawing Sheets

EKF STATE RELAY STRATEGY IN BATTERY ONLINE IDENTIFICATION

TECHNICAL FIELD

This application relates to a vehicle system for estimating traction battery parameters.

BACKGROUND

A hybrid-electric or all-electric vehicle has a traction battery to store and provide energy for vehicle propulsion. In order to improve performance and battery life, it is necessary to operate the battery within certain limits. Operating the battery outside of the limits may decrease the performance or life of the battery. A useful quantity for controlling and operating the battery pack is the battery power capability. The battery power capability indicates how much power the battery is capable of providing (discharge) or receiving (charge) in order to meet driver and vehicle demands.

SUMMARY

A vehicle a battery and a controller programmed to during a period in which a magnitude of a rate of change of a current flowing through the battery exceeds a predetermined rate of change threshold, update values of impedance parameters as learned values generated by a parameter estimation model. The controller is further programmed to, responsive to a transition of the current to a generally constant current, hold the values of the impedance parameters to a state of the learned values immediately prior to the transition. The controller is further programmed to, responsive to a difference in a temperature of the battery between a present time and a time immediately prior to the transition exceeding a predetermined temperature difference, change the values to historical impedance parameter values corresponding to the temperature at the present time. The controller is further programmed to update power limits of the battery according to the values of the impedance parameters and charge and discharge the battery according to power limits.

The controller may be further programmed to, responsive to a difference in a state of charge of the battery between the present time and the time immediately prior to the transition exceeding a predetermined state of charge difference, change the power limits based on historical impedance parameter values corresponding to the state of charge at the present time. The controller may be is further programmed to change an age parameter of the battery according to the values of the impedance parameters. The parameter estimation model may be an extended Kalman filter. The power limits may include a charge power capability and a discharge power capability. The parameter estimation model may further include a voltage parameter value that is indicative of a voltage across an impedance of the battery and the power limits may be further based on the voltage parameter value. The controller may be further programmed to, during the period, change the voltage parameter value based on the values of the impedance parameters, a measured current, and a measured terminal voltage of the battery. The controller may be further programmed to, responsive to the transition of the current to the generally constant current, change the voltage parameter value based on to the state of the learned values immediately prior to the transition, the measured current, and the measured terminal voltage. The controller may be further programmed to, responsive to a difference in a temperature of the battery between a present time and a time immediately prior to the transition exceeding a predetermined temperature difference, change the voltage parameter value based on the historical impedance parameter values, the measured current, and the measured terminal voltage. The historical impedance parameter values may be derived from one or more of a current power cycle and previous power cycles of the controller.

A vehicle includes a battery and a controller programmed to estimate values of impedance parameters of the battery using a parameter estimation model responsive to a magnitude of a rate of change of a current flowing through the battery exceeding a threshold. The controller is further programmed to, responsive to the magnitude falling below the threshold, hold the values constant at values estimated by the parameter estimation model immediately prior to the magnitude falling below the threshold. The controller is further programmed to, responsive to a change in a state of charge of the battery exceeding a predetermined change after the magnitude falls below the threshold, change the values to historical values corresponding to the state of charge. The controller is further programmed to charge and discharge the battery according to power limits derived from the values.

The controller may be further programmed to, responsive to a change in a temperature of the battery exceeding a predetermined temperature change after the magnitude falls below the threshold, change the values to historical values corresponding to the temperature. The parameter estimation model may be an extended Kalman filter. The power limits may include a charge power capability and a discharge power capability. The parameter estimation model may further estimate a voltage parameter value that is indicative of a voltage across an impedance of the battery and the power limits may be further based on the voltage parameter value. The controller may be further programmed to, responsive to the magnitude of the rate of change exceeding the threshold, change the voltage parameter value based on the values of the impedance parameters, a measured current, and a measured terminal voltage of the battery.

A method of controlling a battery includes estimating, by a controller, values of impedance parameters of the battery using a parameter estimation model when a magnitude of a rate of change of a current flowing through the battery exceeds a threshold for at least a predetermined amount of time. The method includes, responsive to a transition of the current to a generally constant current, updating the values of the impedance parameters according to a last state of the values immediately prior to the transition. The method includes, responsive to a difference in a temperature of the battery between a present time and a time immediately prior to the transition exceeding a predetermined temperature difference, changing the values to historical impedance parameter values corresponding to the temperature at the present time. The method includes charging and discharging the battery according to power limits derived from the values of the impedance parameters.

The method may further include, responsive to a difference in a state of charge of the battery between a present time and a time immediately prior to the transition exceeding a predetermined state of charge difference, changing the values to historical impedance parameter values corresponding to the state of charge at the present time. The predetermined amount of time may be a duration over which an error associated with the parameter estimation model converges to zero. The method may further include estimating for the predetermined amount of time a voltage parameter value that is indicative of a voltage across an impedance of the battery based on the values, a measured current, and a measured terminal voltage of the battery, and the power limits may be further derived from the voltage parameter value. The method may further include, responsive to the transition, changing the voltage parameter value based on the measured current, the measured terminal voltage, and the last state of the values immediately prior to the transition. The method may further include, responsive to the difference in the temperature of the battery between the present time and the time immediately prior to the transition exceeding the predetermined temperature difference, changing the voltage parameter value based on the historical impedance parameter values, the measured current, and the measured terminal voltage.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A battery pack may be modeled by an equivalent circuit model (ECM) having an arrangement of impedance components. The ECM may depend on the type and chemistry of the battery being used. The battery power capability may be calculated based on the battery impedance component values of the model. The battery impedance component values may vary with age and temperature of the battery.

A recursive parameter estimation method, such as an Extended Kalman Filter (EKF) may be used to identify battery equivalent circuit model impedance parameters. A shortcoming of the EKF is that it may require some time to converge to the true parameter values. In addition, the EKF may require sufficiently dynamic inputs in order to guarantee convergence to the actual parameter values. In the absence of sufficiently dynamic inputs, the EKF may return inaccurate values. During periods in which the inputs are not sufficiently dynamic, alternative strategies may be defined for updating the parameters and corresponding battery power capability values.

Figure 1:
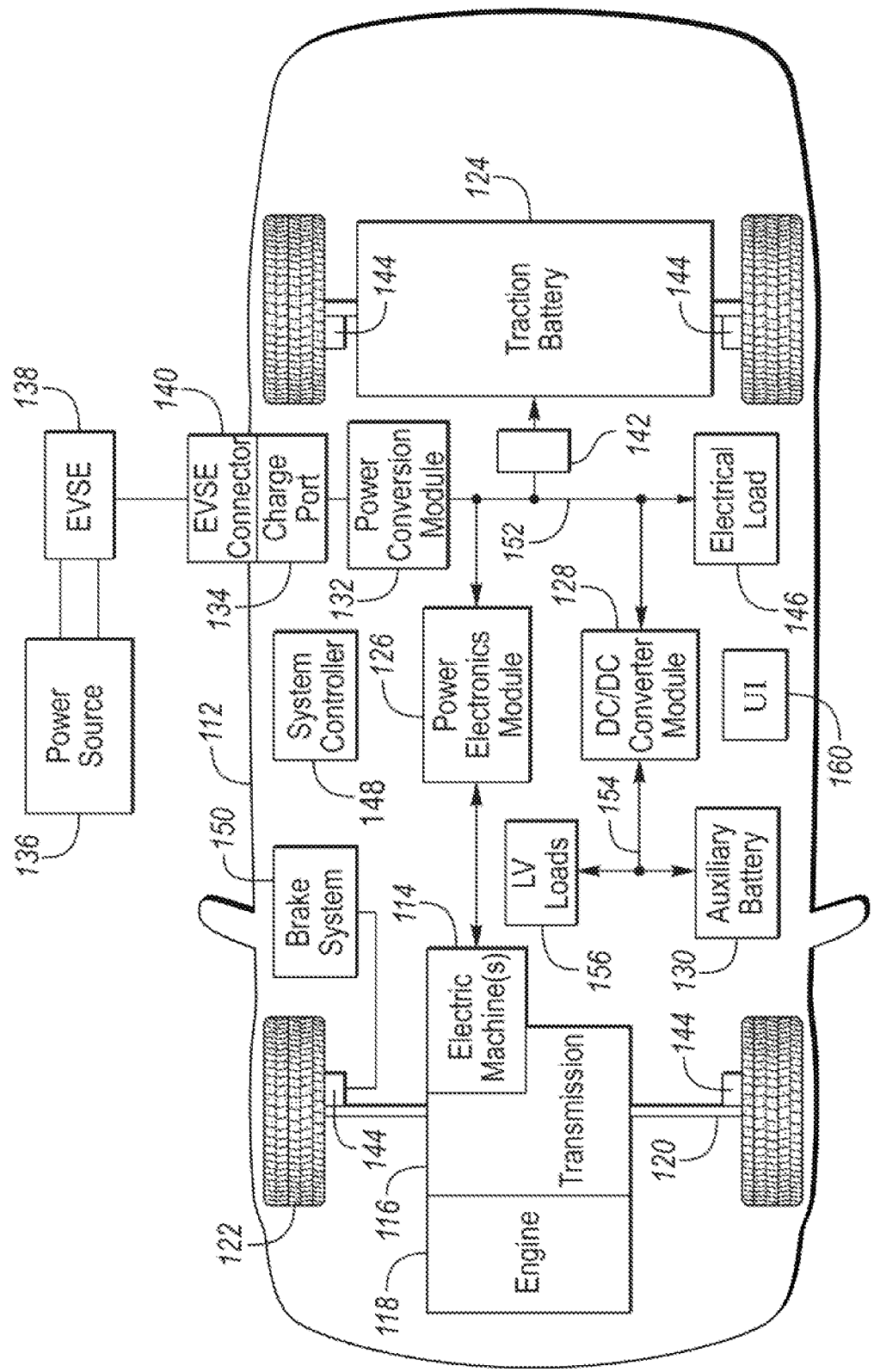
FIG. 1 is a diagram of a plug-in hybrid-electric vehicle illustrating typical drivetrain and energy storage components.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144. The brake system 150 may respond to driver commands and may also operate autonomously to implement features such as stability control. The controller of the brake system 150 may implement a method of applying a requested brake force when requested by another controller or sub-function.

The electrified vehicle 112 may further include a user interface 160. The user interface 160 may provide a variety of display elements for communicating information to the operator. The user interface 160 may provide a variety of input elements for receiving information from the operator. The user interface 160 include one or more displays. The displays may be touch-screen displays. The user interface 160 may include discrete lamps/lights. For example, the lamps may include light-emitting diodes (LED). The user interface 160 may include switches, rotary knobs, and buttons for allowing the operator to change various settings. The user interface 160 may include a control module that communicates via the vehicle network. The user interface 160 may provide one or more display elements that are indicative of charging being inhibited and vehicle operation being inhibited. The user interface 160 may also provide display elements for indicating a single contactor weld condition and a double contactor weld condition. The display elements may include discrete lamps and/or messages in a message display area.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

Figure 2:
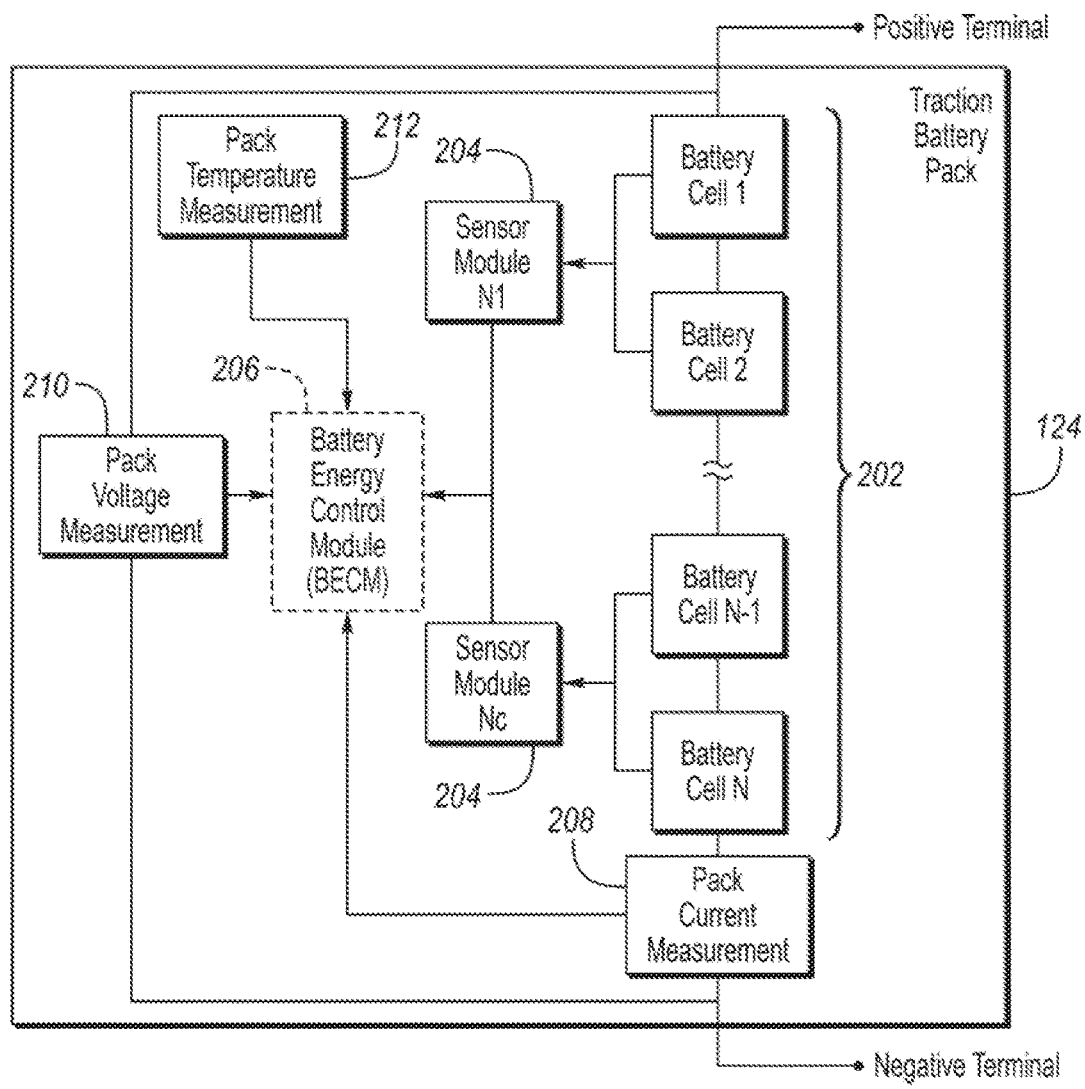
FIG. 2 is a diagram of a possible battery pack arrangement comprised of multiple cells, and monitored and controlled by a Battery Control Module.

The traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the contactor module 142 for opening and closing the associated contactors.

Figure 3:
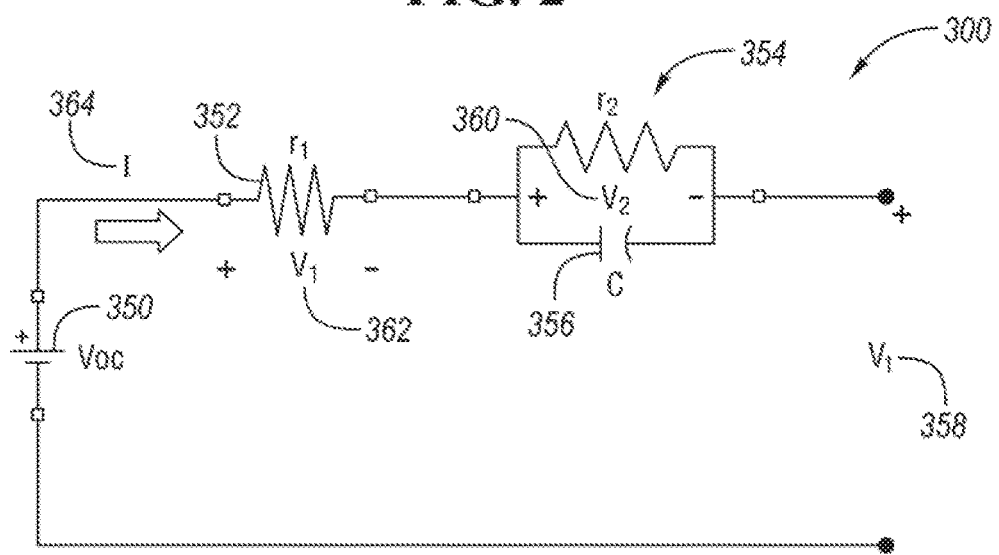
FIG. 3 is a diagram of an example battery cell equivalent circuit.

A Lithium-ion battery may be modeled in different ways. FIG. 3 shows one possible battery cell equivalent circuit model (ECM) 300. A battery cell can be modeled as a voltage source ($V_{oc}$) 350 having resistances (352 and 354) and capacitance 356 associated with it. Because of the battery cell impedance, the terminal voltage, $V_t$ 358, is typically not the same as the open-circuit voltage, $V_{oc}$ 350. The open-circuit voltage, $V_{oc}$ 350, is not readily measurable as only the terminal voltage 358 of the battery cell is accessible for measurement. Because the $V_{oc}$ 350 is not readily measurable, a model-based method may be used to estimate the value. A model may require that the values of resistance and capacitance be known or estimated. The battery cell model may depend on the battery chemistry. The precise model chosen for the battery cell is not necessarily critical to the methods described. The battery cell model may be extended to the entire traction battery 124 comprising battery cells 202 that are electrically coupled together. For example, the various model parameters may have values based on the series/parallel combinations of the various model elements.

Figure 4:
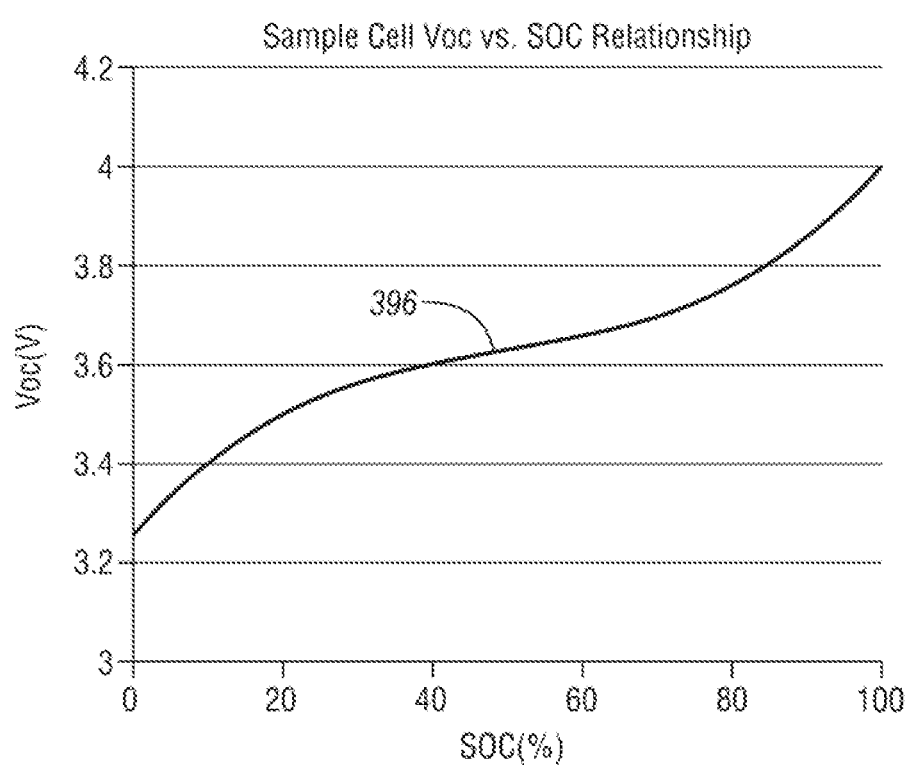
FIG. 4 is a graph that illustrates a possible open-circuit voltage (Voc) vs. battery state of charge (SOC) relationship for a typical battery cell.

For a typical Lithium-Ion battery cell, there is a relationship between SOC and the open-circuit voltage ($V_{oc}$) such that $V_{oc}$=f(SOC). FIG. 4 shows a typical curve 396 showing the open-circuit voltage as a function of SOC. The relationship between SOC and $V_{oc}$ may be determined from an analysis of battery properties or from testing the battery cells. The function may be such that SOC may be calculated as $f^{-1}(V_{oc})$. The function or the inverse function may be implemented as a table lookup or an equivalent equation. The exact shape of the curve 396 may vary based on the exact formulation of the Lithium-Ion battery. The voltage $V_{oc}$ changes as a result of charging and discharging of the battery. The characteristic may be used to estimate the open-circuit voltage value for the following algorithms.

The governing equations for the equivalent circuit model may be written as follows:

$$\dot{V}_2 = -\frac{1}{r_2 C} V_2 + \frac{1}{C} I \quad (1)$$

$$V_{oc} - V_t = V_2 + I r_1 \quad (2)$$

$$\dot{V}_2 = \frac{dV_2}{dt}$$

where: $V_2$ 360 is a voltage across the RC network (C 356/$r_2$ 354) of the circuit model; is the time based derivative of $V_2$ 360; $r_2$ 354 is a charge transfer resistance of the battery; C 360 is a double layer capacitance of the battery; I 364 is the measured current flowing through the battery; $V_{oc}$ 350 is the open circuit voltage of the battery; $V_t$ 358 is the measured battery voltage across the battery terminals (terminal voltage); and $r_1$ 352 is an internal resistance of the battery.

In a typical battery system, some values, such as the current I 364 and the terminal voltage $V_t$ 358 may be measured directly by corresponding sensors. However, the resistance and capacitance values may vary over time and may not be readily measurable. A battery impedance parameter estimation model may be used to calculate the impedance parameters of the battery. One method of estimating the parameters of a system is to utilize a recursive parameter estimation method, such as an Extended Kalman Filter (EKF). For example, an EKF may be constructed that uses the current I 364 as an input, the voltage $V_2$ 360 as a state, and a voltage difference, $V_{oc}-V_t$, as an output. The battery ECM impedance parameters ($r_1$ 352, $r_2$ 354, and C 356) or combinations of the parameters may also be treated as states for identification. Once the parameters and states have been identified, a battery power capability may be calculated based on the operating limits of a battery voltage and current, and the current battery state.

The states of the estimation model may be chosen to allow one or more of the battery impedances and voltage states to be calculated either directly or indirectly. One such set of states for the battery model can be defined as follows:

$$x = \begin{bmatrix} x_1 \\ x_2 \\ x_3 \\ x_4 \end{bmatrix} = \begin{bmatrix} V_2 \\ \frac{1}{r_2 C} \\ \frac{1}{C} \\ r_1 \end{bmatrix} \quad (3)$$

The system output may be defined as:

$$y = V_{oc} - V_t \quad (4)$$

The system output may be estimated using the measured terminal voltage and the open-circuit voltage derived from the state of charge. Equations (1) and (2) may be written in terms of the defined states as follows:

$$\dot{X}_1 = -x_1 x_2 + x_3 I \quad (5)$$

$$y = x_1 + x_4 I \quad (6)$$

Based on the system model to be described below, an observer may be designed to estimate the extended states ($x_1$, $x_2$, $x_3$ and $x_4$). By estimating the states, the battery impedance parameters ($r_1$, $r_2$, and C) and the voltage parameter ($V_2$) may be estimated according to the following equations:

$$\hat{V}_2 = x_1 \quad (7)$$

$$\hat{r}_1 = x_4 \quad (8)$$

$$\hat{r}_2 = \frac{x_3}{x_2} \quad (9)$$

$$\hat{C} = \frac{1}{x_3} \quad (10)$$

An EKF is a dynamic system that may be governed by the following equations:

$$x(k) = f(x(k-1), i(k-1)) + w(k-1) \quad (11)$$

$$y(k) = h(x(k), i(k)) + v(k) \quad (12)$$

where $f(\ )$ is a system function, having k as a time index and $T_s$ is the sampling period, and defined as;

$$f(x(k), i(k)) = \begin{bmatrix} (1 - T_s x_2(k)) x_1(k) + T_s x_3(k) i(k) \\ x_2(k) \\ x_3(k) \\ x_4(k) \end{bmatrix} \quad (13)$$

h( ) is a measurement function defined as;

$$h(x(k),i(k))=x_1(k)+x_4(k)i(k) \tag{14}$$

x(k) is the system state x that is evaluated at a time k*$T_s$ as;

$$x(k) = \begin{bmatrix} x_1(k) \\ x_2(k) \\ x_3(k) \\ x_4(k) \end{bmatrix} \tag{15}$$

i(k) is the input (e.g., battery current, I);
w(k) is a zero mean white process noise with known covariance matrix Q(k);
y(k) is the system output ($V_{oc}-V_t$); and
v(k) is a zero mean white measurement noise with known covariance matrix, R(k);

The discrete-time domain model defined by the equations is a nonlinear system. A state-transition model, $$F(k) = \left.\frac{\partial f}{\partial x}\right|_{x(k),i(k)},$$

and an observation model, $$H(k) = \left.\frac{\partial h}{\partial x}\right|_{x(k),i(k)},$$

may be defined. To linearize the equations, the Jacobians of the system function and the measurement function may be derived as:

$$F(k) = \left.\frac{\partial f}{\partial x}\right|_{x(k),i(k)} = \begin{bmatrix} 1-T_sx_2(k) & -T_sx_1(k) & -T_si(k) & 0 \\ 0 & 1 & 0 & 0 \\ 0 & 0 & 1 & 0 \\ 0 & 0 & 0 & 1 \end{bmatrix} \tag{16}$$

$$H(k) = \left.\frac{\partial h}{\partial x}\right|_{x(k),i(k)} = [1 \ 0 \ 0 \ i(k)] \tag{17}$$

The linearized difference equations of the ECM may be expressed as:

$$x(k)=F(k)x(k-1)+w(k-1) \tag{18}$$

$$y(k)=H(k)x(k)+v(k) \tag{19}$$

These equations represent the linearized ECM system and may be used in the EKF recursive processing. The complete set of EKF equations consists of time update equations and measurement update equations. A first variable, $\hat{x}(k|k)$, may represent an a posteriori state estimate of the states x(k) at a time step k given measurements up to and including time k (e.g., y(k), y(k−1), ... ). A second variable, $\hat{x}(k|k-1)$, may represent an a priori state estimate (or prediction) of x(k) by using $\hat{x}(k-1|k-1)$, which does not include the information of measurement y(k) at time step k. P(k|k) may represent an a posterior estimation error covariance matrix for x(k) given measurements up to and including time k (e.g., y(k), y(k−1), ... ). P(k|k) may be a measure of the accuracy of the state estimate. The equation P(k|k)=cov(x(k)−$\hat{x}(k|k)$) may define the error covariance matrix. P(k|k−1) may represent the state prediction error covariance matrix of x(k) given prior measurements (e.g., y(k−1), y(k−2), ... ).

Figure 5:
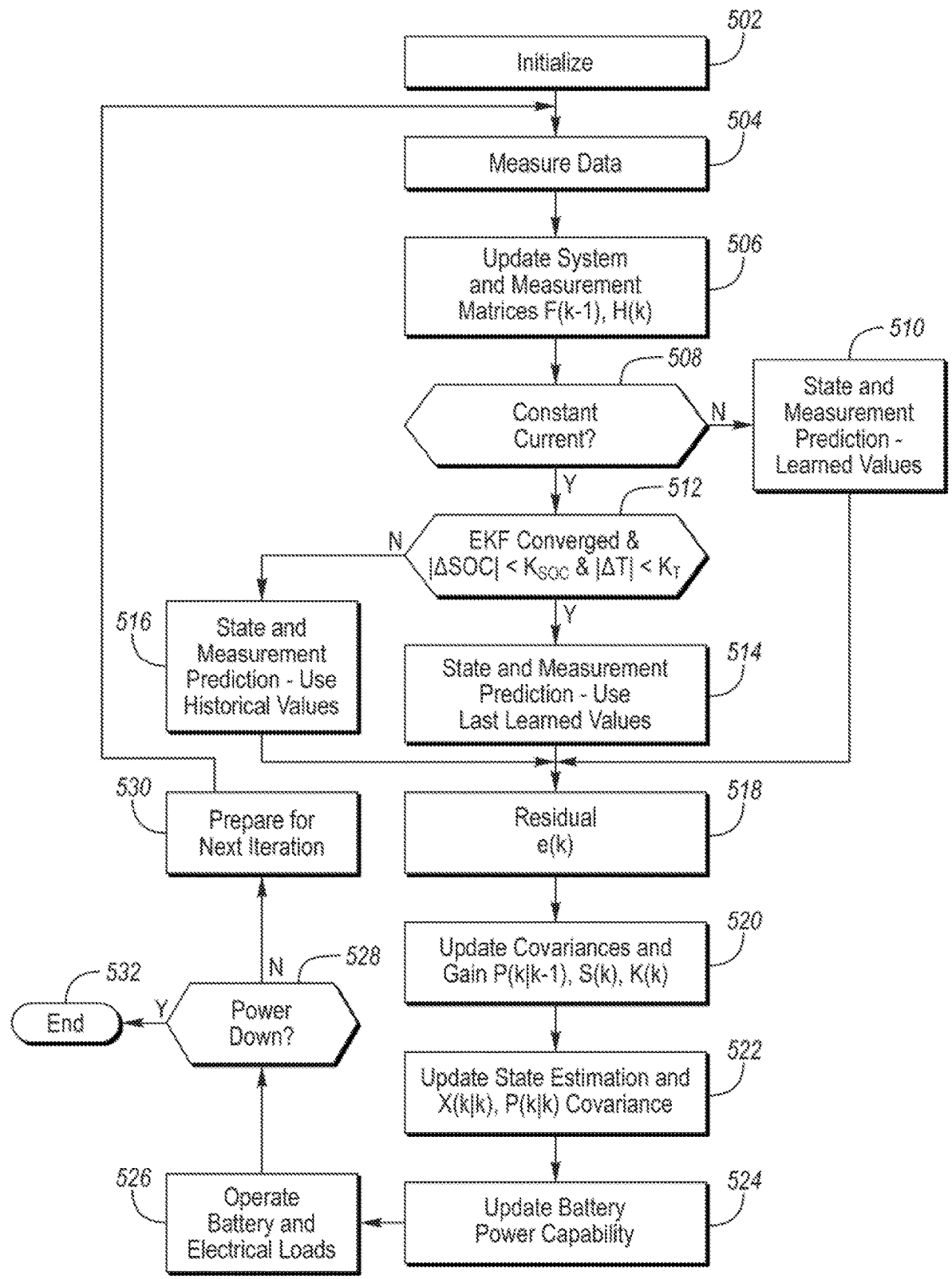
FIG. 5 is a flowchart for a possible sequence of operations for estimating states of battery parameters.

FIG. 5 depicts a flowchart for a possible sequence of operations for implementing a state estimation for operating a battery. The controller may be programmed to execute a parameter estimation model to estimate impedance and voltage parameters of the battery. The operations may be implemented in a controller such as the BECM 206. The recursive processing of the extended Kalman filter may be executed at predefined sampling intervals. At operation 502, parameters and variables for the state estimation may be initialized. For example, $\hat{x}(k-1|k-1)$, P(k−1|k−1) and i(k−1), and input i(k) may be initialized. States may be initialized to a last known state or may be initialized to default values. Parameters or variables associated with measured values may be initialized by sampling the corresponding sensor.

Operation 504 may represent a start of each iteration. At operation 504, new information may be generated by measuring or computing corresponding parameters. Previously known or generated values may be collected and/or computed. At each time step k, values of $\hat{x}(k-1|k-1)$, P(k−1|k−1) and i(k−1) may be known from prior iterations. At operation 504, new information may be measured. For example, y(k) may be derived from a voltage measurement and i(k) may be derived from a current measurement.

At operation 506, the system and measurement matrices may be updated. The state transition matrix, F(k), may be updated using the previous state estimate, $\hat{x}(k-1|k-1)$, and the previous current measurement, i(k−1), in the above-described equations. The measurement matrix, H(k), may be updated using the present current measurement, i(k), in the above-described equations.

At operation 508, a check may be performed to determine if the battery current is generally constant. The check may be further generalized as a check for persistent excitation condition to ensure that the inputs to the parameter estimate are sufficiently dynamic. For example, the battery current may be generally constant if the derivative of the current is approximately zero for at least a predetermined time. If the battery current is not a generally constant current, operation 510 may be performed. Additional details regarding the constant current check are provided below. Operations performed when the current is generally constant are also described below. Operation 510 may represent the normal state and measurement prediction to generate the learned state values for further use in the estimation.

At operation 510, the states and outputs may be predicted or learned. The controller may be programmed to generate a prediction of the (a priori) state estimate as:

$$\hat{x}(k|k-1)=f(\hat{x}(k-1|k-1),i(k)) \tag{20}$$

The controller may then be programmed to generate a prediction of the (a priori) measurement estimate:

$$\hat{y}(k|k-1)=h(\hat{x}(k(k-1),i(k)) \tag{21}$$

At operation 518, the measurement residual may be generated. The controller may be programmed to calculate the measurement residual (or innovation) as:

$$e(k)=y(k)-\hat{y}(k|k-1) \tag{22}$$

At operation 520, the state and measurement prediction covariances and the Kalman gain may be computed. A Kalman gain, K(k), may be calculated by first predicting an (a priori) state estimate covariance as follows:

$$P(k|k-1)=F(k-1)P(k-1|k-1)F(k-1)'+Q(k-1) \tag{23}$$

A measurement residual (or innovation) covariance $S(k)=\text{cov}(e(k))$ may be generated as follows:

$$S(k)=H(k)P(k|k-1)H(k)'+R(k) \quad (24)$$

The Kalman gain may then be computed as:

$$K(k)=P(k|k-1)H(k)'S(k)^{-1} \quad (25)$$

At operation 522, the state estimation and the state estimation covariance may be computed. The controller may be programmed to update the (a posteriori) state estimate as follows:

$$\hat{x}(k|k)=\hat{x}(k|k-1)+K(k)e(k) \quad (26)$$

where $K(k)$ is the Kalman gain. The (a posteriori) state estimate covariance may be updated according to following equation:

$$P(k|k)=(I-K(k)H(k))P(k|k-1)(1-K(k)H(k))'+K(k)R(k)K(k)' \quad (27)$$

and may be equivalently be expressed as:

$$P(k|k)=(I-K(k)H(k))P(k|k-1) \quad (28)$$

The ECM parameters may be derived from the state estimates as follows:

$$\hat{V}_2(k) = \hat{x}_1(k|k) \quad (29)$$

$$\hat{r}_1(k) = \hat{x}_4(k|k) \text{ if } \hat{x}_4(k|k) > 0 \quad (30)$$

$$\hat{r}_2(k) = \frac{\hat{x}_3(k|k)}{\hat{x}_2(k|k)} \text{ if } \hat{x}_2(k|k) > 0 \text{ and } \hat{x}_3(k|k) > 0 \quad (31)$$

$$\hat{c}(k) = \frac{1}{\hat{x}_3(k|k)} \text{ if } \hat{x}_3(k|k) > 0 \quad (32)$$

When the ECM parameters are estimated, other derived values may be computed. At operation 524, the battery power capability may be calculated based on the estimated ECM parameters as will be described herein. Several battery power capability parameters may be defined. An allowed minimum pack voltage, $v_{min}$, may be defined that may change with battery temperature. An allowed maximum pack voltage, $v_{max}$, may be defined that may change with battery temperature. The minimum pack voltage and the maximum pack voltage may be defined by the manufacturer based on the battery characteristics. A discharge current limit, $i_{dchlim}$, may be defined that changes with battery temperature and SOC. A charge current limit, $i_{chlim}$, may be defined that changes with battery temperature and SOC. The battery power capability parameters may be computed for different time intervals. A time duration, $t_d$, may be defined for the power capability estimates. The time duration may be indicative of the time over which the power capability is rated. For example, a one-second power capability estimation may be defined by setting the time duration to one second and a half-second power capability estimation may be defined by setting the time duration to a half second. The power capability may describe the amount of power that may be provided to or from the battery during the time duration.

The first order differential equations described above may be solved using the estimated battery ECM parameters in the equations to yield the following expression for the battery current (I).

$$I = \frac{\left(v_{oc} - v_t - \hat{v}_2(0)e^{-t_d/(\hat{r}_2\cdot\hat{c})}\right)}{\left[\hat{r}_1 + \hat{r}_2\left(1 - e^{-t_d/(\hat{r}_2\cdot\hat{c})}\right)\right]} \quad (33)$$

where: $t_d$ is the predetermined time duration; $\hat{V}_2(0)$ is the present value of $V_2$, and e is the base of the natural logarithm.

In general, once the value for the current (I) is determined, the battery power capability can be estimated. Where it is desired to determine a charge power capability for the battery, the current equation can be solved for a minimum value of current (I), such as described in the following equation. By convention, current is defined as a positive (+) quantity when flowing away from a battery (discharge), and as a negative (−) quantity when flowing into the battery (charge).

$$I(t_d, v_{max}) = \frac{v_{oc} - v_{max} - \hat{v}_2(0)e^{-t_d/(\hat{r}_2\hat{c})}}{\left[\hat{r}_1 + \hat{r}_2\left(1 - e^{-t_d/(\hat{r}_2\hat{c})}\right)\right]} \quad (34)$$

where: the value of ($t_d$) is the predetermined time duration, and may be for example, between 0.5 sec. and 10 sec., and $V_{max}$ is a maximum operating voltage for the battery, and may be considered a limiting battery voltage.

The minimum current may be defined as:

$$i_{min}=\max(I(t_d,v_{max}),i_{chlim}) \quad (35)$$

The charge power capability may be defined as:

$$P_{cap\_ch}(t_d)=|i_{min}|\{V_{oc}-\hat{V}_2(0)e^{-t_d/(\hat{r}_2\hat{c})} -i_{min}*[\hat{r}_1+\hat{r}_2(1-e^{-t_d/(\hat{r}_2\hat{c})})]\} \quad (36)$$

The time value ($t_d$) can be based on how the battery power capabilities are used by vehicle system controller. The maximum voltage ($v_{max}$) may be determined, for example, by a vehicle manufacturer or a battery manufacturer as the maximum voltage that the battery is allowed to attain.

In addition to determining a charge power capability for a battery, a method for determining a discharge power capability for the battery may also be provided. For determining the discharge power capability, a maximum value of the battery current (I) may be used in conjunction with a minimum value of the battery voltage. The current equation described above can be used to solve for $I_{max}$ as:

$$I(t_d, v_{min}) = \frac{v_{oc} - v_{min} - \hat{v}_2(0)e^{-t_d/(\hat{r}_2\hat{c})}}{\left[\hat{r}_1 + \hat{r}_2\left(1 - e^{-t_d/(\hat{r}_2\hat{c})}\right)\right]} \quad (37)$$

where: $v_{min}$ is a minimum operating voltage of the battery pack.

The maximum current may be defined as:
(38)

$$i_{max}=\min(I(t_d,v_{min}),i_{dchhlim}) \quad (38)$$

The discharge power capability may be defined as:

$$P_{cap\_dch} = |i_{max}|\left\{V_{oc} - \hat{V}_2(0)e^{\frac{t_d}{\hat{r}_2\hat{c}}} - i_{max}*\left[\hat{r}_1 + \hat{r}_2\left(1 - e^{-\frac{t_d}{\hat{r}_2\hat{c}}}\right)\right]\right\} \quad (39)$$

The battery power capability is based on the battery ECM impedance parameters (e.g., $r_1$, $r_2$ and C) that are estimated by the EKE The battery power capability is further based on the ECM voltage parameter ($V_2$) that is estimated by the model. Note that other calculation methods for the battery power capability may be possible. The above calculation scheme is merely representative of using a battery impedance parameter estimation model to calculate battery power capability.

At operation 526, the battery and electrical loads may be operated based on the calculated battery power capability. That is, battery current and voltage may be maintained so as not to exceed the battery power capability. Battery power during charging and discharging may be defined as the product of the voltage across the battery terminals and the current flowing through the battery. Electrical loads receiving power from or providing power to the battery may be operated such that the total power of all loads falls within the calculated battery power capability. For example, electric machines may have power limits reduced so that the battery power capability is not exceeded. The controller may manage the electrical loads to maintain the battery power within the computed limits.

At operation 528 a check may be performed to determine if the system is powered down. For example, the system may be powered down in response to an ignition off command. The system may be powered down when the BECM 206 is requested to enter a sleep mode. If the system is requested to power down, the process may terminate at operation 532. If the system is not requested to power down, operation 530 may be performed. At operation 530, instructions may be implemented to prepare for the next iteration. For example, a time increment may be increased. In addition, the system may initialize or update other variables for the next iteration. Execution may then repeat starting from operation 504.

The above description thus far describes an example of using an EKF to estimate the states and impedance parameters of a battery ECM. The impedance parameters are a function of the ECM that is chosen. The methods described below are applicable to other battery circuit model formulations as well. For example, the states may be defined differently having more or less states or parameters to estimate. In addition, the battery power capability estimate may be adjusted to correspond to the particular formulation used.

The battery power capability is a useful quantity for effectively controlling the powertrain. The above description is one example of using an Extended Kalman Filter (EKF) to identify battery equivalent circuit model impedance parameters and calculating the related battery power capabilities from the battery impedance parameters. The EKF may require some time to converge to the true parameter values. The convergence time may be a function of the starting values that are used to initialize the EKF. The convergence of the EKF may be influenced by an efficient choice of the initial parameter values.

As the traction battery 124 ages, the capacity, power and energy may decay or decrease. By analyzing battery current and voltage behavior, decayed power capability of the battery can be estimated online by using, for example, the EFK framework based on the battery equivalent circuit model. In the battery ECM, the resistances and capacitance will change with battery age, temperature, and SOC.

The ECM impedance parameters ($r_1$, $r_2$, and c) may change over a large range with temperature. For example, for the same SOC and discharge current, battery terminal voltage may be much lower at low temperatures than at room temperature because $r_1$ at low temperature is typically greater than that at room temperature. This results in decrease in the discharge power capability at low temperature when compared with the discharge power capability at room temperature. Correctly adjusting the battery parameters to compensate for this can ensure that the battery is operated within the proper limits.

For the EKF to properly converge, persistent excitation conditions may be defined to achieve an accurate online identification for the ECM parameters and, consequently, an accurate model-based battery power capability estimation. Persistent excitation may be achieved by the battery current being dynamic or sufficiently variable. Operation 508 may be configured to check if the battery current is sufficiently dynamic. The current may not be considered to be sufficiently dynamic when the current is generally constant. A generally constant current may be defined as a current that remains within a small range of current values for a time interval greater than a predetermined time. When constant current (including OA current) is flowing through battery, the normal EKF recursion calculation (operation 510) described above may be inhibited or altered since feeding a constant current input into the EKF may drive the online estimation to diverge from the true ECM parameter values. To prevent this condition, when a constant current is detected, updates to the ECM impedance parameters $r_1$, $r_2$, c and related EKF states may be inhibited or altered. The EKF state for the voltage drop across the RC network, $V_2$ may still be updated according to battery current, terminal voltage and SOC information.

Further, when a constant current (including OA current) is detected, the ECM impedance parameters $r_1$, $r_2$, c and related EKF states may be updated according to temperature and SOC by using historic learned ECM parameters $r_1$, $r_2$, c. However, problems may occur in low temperature conditions. For example, at low temperatures, the EKF may estimate a high value for $r_1$ from a dynamically rich battery current. The battery may then be operated at a constant current and battery may warm up due to the constant current usage or the environment temperature. If the high value $r_1$ learned at low temperature is also used for the discharge power capability estimation at high temperature, the discharge power capability may be underestimated at the high temperatures. This may affect vehicle drivability and fuel economy. Similarly, if the low $r_1$ value learned at high temperature is used for low temperature discharge power capability estimation, the discharge power capability estimation at low temperature may be overestimated and may cause the battery to be overdischarged.

With continuous dynamic current flowing through the battery, the EKF may learn $r_1$, $r_2$ and c accurately (e.g., larger $r_1$ at low temperature and relatively smaller $r_1$ at high temperature) even though battery temperature and SOC change over time. Thus, battery power capability can be estimated correctly. The strategy disclosed herein improves the battery online power capability estimation when there is no continuous dynamic current flowing through the battery and at the same time battery status (like SOC and temperature) changes over time.

Responsive to detecting that a dynamic current is flowing through battery (e.g., no constant current detected at operation 508), EKF states can be updated according to the above-described equations as:

$$\hat{x}(k\mid k-1) = \begin{bmatrix} \hat{x}_1(k\mid k-1) \\ \hat{x}_2(k\mid k-1) \\ \hat{x}_3(k\mid k-1) \\ \hat{x}_4(k\mid k-1) \end{bmatrix} = \quad (40)$$

$$\begin{bmatrix} (1 - T_2\hat{x}_2(k-1\mid k-1))\hat{x}_1(k-1\mid k-1) + T_s\hat{x}_3(k-1\mid k-1)i(k) \\ \hat{x}_2(k-1\mid k-1) \\ \hat{x}_3(k-1\mid k-1) \\ \hat{x}_4(k-1\mid k-1) \end{bmatrix}$$

The above equation describes the state prediction of operation 510. The determination that the battery current is sufficiently dynamic may be achieved by a variety of methods. One method may be to evaluate the derivative or rate of change of the battery current. For example, the battery current may be sufficiently dynamic if a magnitude of the derivative exceeds a predetermined threshold. For example, the battery current may be sufficiently dynamic when the following condition is satisfied:

$$\left|\frac{di}{dt}\right| > K \quad (41)$$

The condition may be monitored over time to ensure that the condition is satisfied for a sufficient duration. For example, there may be periods of time in which the derivative is changing signs. The battery current may not be sufficiently dynamic when a generally constant current is measured for a predetermined time period. When the current is sufficiently dynamic, the EKF state estimation may be performed. During periods in which the magnitude of the rate of change of the current flowing through the battery exceeds a predetermined rate of change threshold, the controller may learn the impedance parameters according to the parameter estimation model described above. Other persistent excitation criteria may be defined.

When the battery current is not sufficiently dynamic (e.g., generally constant current detected at operation 508), the normal EKF sequencing (e.g., operation 510) may be paused or inhibited to prevent learning inaccurate values. If a generally constant current is identified at operation 508, operation 512 may be performed.

At operation 512, a check is performed to determine how the state predictions are to be updated in the absence of a dynamically varying current. A check is included to determine if the EKF has converged. The EKF may be converged if a magnitude of the residual, e(k), is less than a predetermined value (e.g., small number). A residual near zero may be indicative of the state estimates being close in value to the true parameter values. A check is included to determine if a magnitude of a change in the SOC is less than a predetermined SOC difference. A check is included to determine if a magnitude of a temperature difference is less than a predetermined temperature difference. A time point, $k_{last\_valid}$, may be defined as the time point that is the last time that dynamic current was flowing through the battery after the EKF algorithm has been deemed converged. A later time, k, that is more recent in time than, $k_{last\_valid}$, may represent the time of the current iteration. The magnitude of the change in SOC ($|\Delta SOC|$) may be defined as the absolute value of a difference between the battery SOC at time, k, and the battery SOC at time, $k_{last\_valid}$. The magnitude of the change in the battery temperature ($|\Delta T|$) may be defined as the absolute value of a difference between the battery temperature at time, k, and the battery temperature at time, $k_{last\_valid}$.

If all of the conditions of operation 512 are satisfied, operation 514 may be performed. At operation 514, the internal states of the EKF may be maintained at previous values (e.g., the last learned state estimates). The EKF state relay may be performed as:

$$\hat{x}(k\mid k-1) = \begin{bmatrix} \hat{x}_1(k\mid k-1) \\ \hat{x}_2(k\mid k-1) \\ \hat{x}_3(k\mid k-1) \\ \hat{x}_4(k\mid k-1) \end{bmatrix} = \quad (42)$$

$$\begin{bmatrix} V_{oc}(k) - V_t(k) - \hat{x}_4(k_{last\_valid}\mid k_{last\_valid}) * i(k) \\ \hat{x}_2(k_{last\_valid}\mid k_{last\_valid}) \\ \hat{x}_3(k_{last\_valid}\mid k_{last\_valid}) \\ \hat{x}_4(k_{last\_valid}\mid k_{last\_valid}) \end{bmatrix}$$

The EKF impedance-related states $x_2$, $x_3$, and $x_4$ at time k will carry over the values from the time point $k_{last\_valid}$. The first EKF voltage-related state $x_1$ may be estimated from the battery OCV, the battery terminal voltage measurement, and the voltage drop across the serial resistance $r_1$. During periods of generally constant current (e.g., battery current not sufficiently dynamic) with stable SOC and temperature values, the last valid estimated parameters may be used. As the SOC and temperature are stable, the parameters are assumed to have not changed. Responsive to a transition of the current to a generally constant current, the controller may hold the impedance parameters to a last state of the impedance parameters generated by the parameter estimation model immediately prior to the transition to the generally constant current. Upon completion of operation 514, operations starting from operation 518 are performed as described above.

The parameter estimation model further includes a voltage parameter or state ($x_1$) that is indicative of a voltage across an impedance of the battery. The power limits are further based on the voltage parameter and the controller may be programmed to, during the period in which current is sufficiently dynamic, change the voltage parameter based on the impedance parameters, a measured current, and a measured terminal voltage of the battery. The controller may be further programmed to, responsive to the transition of the current to the generally constant current, change the voltage parameter based on to a last state of the impedance parameters immediately prior to the transition, the measured current, and the measured terminal voltage. The controller may be further programmed to, responsive to a difference in a temperature of the battery between a present time and a time immediately prior to the transition to the generally constant current exceeding a predetermined temperature difference, change the voltage parameter based on the historical impedance parameters, the measured current, and the measured terminal voltage.

An estimate of battery power capability may be required before the EKF has converged. For an initial period following vehicle initialization the values calculated by the battery impedance parameter estimation model may vary until the true values are learned. Vehicle initialization may include the driver cycling the ignition to an on condition, insertion of a charger into a vehicle charge port for charging the vehicle, or any other condition that may cause the vehicle to switch from an off state to an on or ready state. During this initial period following vehicle initialization, an alternative means of calculating the battery power capability may be desirable.

If any of the conditions at operation 512 are not satisfied, operation 516 may be performed. If the EKF has not converged, or even if the EKF has already converged but the battery SOC and temperature have changed more than a predetermined amount from the corresponding values at time $k_{last\_valid}$, then, while a generally constant current flowing through battery, the EKF state relay may be performed using previously learned historic values as:

$$\hat{x}(k \mid k-1) = \begin{bmatrix} \hat{x}_1(k \mid k-1) \\ \hat{x}_2(k \mid k-1) \\ \hat{x}_3(k \mid k-1) \\ \hat{x}_4(k \mid k-1) \end{bmatrix} = \begin{bmatrix} V_{oc}(k) - V_t(k) r_{1\_historic} * i(k) \\ 1/(r_{2\_historic} * c_{historic}) \\ 1/c_{historic} \\ r_{1\_historic} \end{bmatrix} \quad (43)$$

When temperature and/or SOC change appreciably during a generally constant current mode, the state estimates may use historic values of the parameters. For example, the controller may maintain a table of historic parameter values that may be indexed by SOC and temperature. The controller may update the historic parameters during conditions in which the EKF is accurately estimating the parameters. The impedance parameters, $r_{1\_historic}$, $r_{2\_historic}$, and $c_{historic}$ may be the previous EKF-learned ECM parameter values in the same key cycle and/or from previous key cycles. The online learning results may be saved in non-volatile memory for the SOC and temperature at time k. The above expression uses the terms of the impedance parameters. However, the historic impedance values may be also be converted to the corresponding state values for the model. Responsive to a difference in a temperature of the battery between a present time and a time immediately prior to the transition to the generally constant current exceeding a predetermined temperature difference, the controller may change the impedance parameters to historical impedance parameters corresponding to the temperature at the present time. Responsive to a difference in a state of charge of the battery between the present time and the time immediately prior to the transition to the generally constant current exceeding a predetermined state of charge difference, the controller may change the power limits based on historical impedance parameters corresponding to the state of charge at the present time. Upon completion of operation 516, operations starting from operation 518 are performed as described above.

If the execution path proceeds via operation 514 or operation 516, operations 518-522 related to the EKF may continue to be performed. When the current is generally constant or slowly varying, the estimation may predict the same state estimates at each iteration. This may result in a residual, e(k), that is near zero. When the residual is near zero, the final state estimate will be the close to the a priori state estimation. As a result, the above strategy effectively sets the state estimates during periods of constant current. The strategy presets the a priori state estimate at each iteration. However, the additional EKF steps may not cause an update to the impedance parameters.

The strategy may define a method for controlling the battery. Processes may be implemented for estimating impedance parameters of the battery using a parameter estimation model when a magnitude of a rate of change of a current flowing through the battery exceeds a threshold for at least a predetermined amount of time. The predetermined amount of time may be a duration over which an error associated with the parameter estimation model converges to zero. Responsive to a transition of the current to a generally constant current, the controller may update the impedance parameters according to a last state of the impedance parameters immediately prior to the transition. Responsive to a difference in a temperature of the battery between a present time and a time immediately prior to the transition exceeding a predetermined temperature difference, the controller may change the impedance parameters to historical impedance parameters corresponding to the temperature at the present time. Responsive to a difference in a state of charge of the battery between a present time and a time immediately prior to the transition exceeding a predetermined state of charge difference, the controller may change the impedance parameters to historical impedance parameters corresponding to the state of charge at the present time.

The controller may estimate for the predetermined amount of time a voltage parameter that is indicative of a voltage across an impedance of the battery based on the impedance parameters, a measured current, and a measured terminal voltage of the battery. Responsive to the transition, the controller may change the voltage parameter based on the measured current, the measured terminal voltage, and the last state of the impedance parameters immediately prior the transition to the generally constant current. Responsive to the difference in the temperature of the battery between the present time and the time immediately prior to the transition exceeding the predetermined temperature difference, the controller may change the voltage parameter based on the historical impedance parameters, the measured current, and the measured terminal voltage.

The controller may charge and discharge the battery according to power limits derived from the impedance parameters and the voltage parameter. The controller may operate electrical loads to remain within the power limits.

The disclosed strategy intelligently updates the state parameter estimation to ensure that the most appropriate parameter values are utilized. During times when conditions are present for learning the parameters, the parameters will be learned according the EKF. During times when conditions are not present for learning the parameters (e.g., constant current), the parameters may be held at the last learned values. In addition, the strategy checks for conditions in which the last learned values may not be accurate and updates the values according to historical parameter values. The strategy allows the learning algorithm to execute as much as possible while providing alternative methods for parameter updates when the learning algorithm is expected to provide inaccurate results.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a battery; and
a controller programmed to (i) during a period in which a magnitude of a rate of change of a current flowing through the battery exceeds a predetermined rate of change threshold, update values of impedance parameters as learned values generated by a parameter estimation model, (ii) responsive to a transition of the current to a generally constant current, hold the values of the impedance parameters to a state of the learned values immediately prior to the transition, (iii) responsive to a difference in a temperature of the battery between a present time and a time immediately prior to the transition exceeding a predetermined temperature difference, change the values to historical impedance parameter values corresponding to the temperature at the present time, and (iv) update power limits of the battery according to the values of the impedance parameters and charge and discharge the battery according to power limits.

2. The vehicle of claim 1, wherein the controller is further programmed to, responsive to a difference in a state of charge of the battery between the present time and the time immediately prior to the transition exceeding a predetermined state of charge difference, change the power limits based on historical impedance parameter values corresponding to the state of charge at the present time.

3. The vehicle of claim 1, wherein the controller is further programmed to change an age parameter of the battery according to the values of the impedance parameters.

4. The vehicle of claim 1, wherein the parameter estimation model is an extended Kalman filter.

5. The vehicle of claim 1, wherein the power limits include a charge power capability and a discharge power capability.

6. The vehicle of claim 1, wherein the parameter estimation model further includes a voltage parameter value that is indicative of a voltage across an impedance of the battery and wherein the power limits are further based on the voltage parameter value, and wherein the controller is programmed to, during the period, change the voltage parameter value based on the values of the impedance parameters, a measured current, and a measured terminal voltage of the battery.

7. The vehicle of claim 6, wherein the controller is further programmed to, responsive to the transition of the current to the generally constant current, change the voltage parameter value based on to the state of the learned values immediately prior to the transition, the measured current, and the measured terminal voltage.

8. The vehicle of claim 7, wherein the controller is further programmed to, responsive to a difference in a temperature of the battery between a present time and a time immediately prior to the transition exceeding a predetermined temperature difference, change the voltage parameter value based on the historical impedance parameter values, the measured current, and the measured terminal voltage.

9. The vehicle of claim 1, wherein the historical impedance parameter values are derived from one or more of a current power cycle and previous power cycles of the controller.

10. A vehicle comprising:
a battery; and
a controller programmed to (i) estimate values of impedance parameters of the battery using a parameter estimation model responsive to a magnitude of a rate of change of a current flowing through the battery exceeding a threshold, (ii) responsive to the magnitude falling below the threshold, hold the values constant at values estimated by the parameter estimation model immediately prior to the magnitude falling below the threshold, (iii) responsive to a change in a state of charge of the battery exceeding a predetermined change after the magnitude falls below the threshold, change the values to historical values corresponding to the state of charge, and (iv) charge and discharge the battery according to power limits derived from the values.

11. The vehicle of claim 10, wherein the controller is further programmed to, responsive to a change in a temperature of the battery exceeding a predetermined temperature change after the magnitude falls below the threshold, change the values to historical values corresponding to the temperature.

12. The vehicle of claim 10, wherein the parameter estimation model is an extended Kalman filter.

13. The vehicle of claim 10, wherein the power limits include a charge power capability and a discharge power capability.

14. The vehicle of claim 10, wherein the parameter estimation model further estimates a voltage parameter value that is indicative of a voltage across an impedance of the battery and wherein the power limits are further based on the voltage parameter value, and wherein the controller is programmed to, responsive to the magnitude of the rate of change exceeding the threshold, change the voltage parameter value based on the values of the impedance parameters, a measured current, and a measured terminal voltage of the battery.

15. A method of controlling a battery comprising:
estimating, by a controller, values of impedance parameters of the battery using a parameter estimation model when a magnitude of a rate of change of a current flowing through the battery exceeds a threshold for at least a predetermined amount of time;

responsive to a transition of the current to a generally constant current, updating the values of the impedance parameters according to a last state of the values immediately prior to the transition;

responsive to a difference in a temperature of the battery between a present time and a time immediately prior to the transition exceeding a predetermined temperature difference, changing the values to historical impedance parameter values corresponding to the temperature at the present time; and charging and discharging the battery according to power limits derived from the values of the impedance parameters.

16. The method of claim 15 further comprising, responsive to a difference in a state of charge of the battery between a present time and a time immediately prior to the transition exceeding a predetermined state of charge difference, changing the values to historical impedance parameter values corresponding to the state of charge at the present time.

17. The method of claim 15, wherein the predetermined amount of time is a duration over which an error associated with the parameter estimation model converges to zero.

18. The method of claim 15, further comprising estimating for the predetermined amount of time a voltage parameter value that is indicative of a voltage across an impedance of the battery based on the values, a measured current, and a measured terminal voltage of the battery, wherein the power limits are derived from the voltage parameter value.

19. The method of claim 18, further comprising, responsive to the transition, changing the voltage parameter value based on the measured current, the measured terminal voltage, and the last state of the values immediately prior the transition.

20. The method of claim 19, further comprising, responsive to the difference in the temperature of the battery between the present time and the time immediately prior to the transition exceeding the predetermined temperature difference, changing the voltage parameter value based on the historical impedance parameter values, the measured current, and the measured terminal voltage.

* * * * *